United States Patent [19]

Hartman et al.

[11] 4,418,251

[45] Nov. 29, 1983

[54] MECHANISM FOR ASSURING REGISTRATION AND CONTACT BETWEEN MULTIPLE TRAVELING COLLECTORS AND PARALLEL CONDUCTORS

[75] Inventors: Peter W. Hartman, Pittsford; Keith E. Hanford, Macedon; Stephen L. Markle, Rochester; Elmer C. Hartman, Fairport, all of N.Y.

[73] Assignee: Allis-Chalmers Corporation, Milwaukee, Wis.

[21] Appl. No.: 332,980

[22] Filed: Dec. 21, 1981

[51] Int. Cl.³ .......................... B60L 5/36; B60L 5/08; B60L 5/30

[52] U.S. Cl. ....................................... 191/35; 191/58; 191/59.1; 191/60.2; 191/60.3; 191/70; 191/83

[58] Field of Search ................... 191/45, 45 A, 50, 57, 191/58, 59, 59.1, 60, 60.1, 60.2, 60.3, 64, 66, 68, 69, 72, 82, 83, 35, 70

[56] References Cited

U.S. PATENT DOCUMENTS

| | | | |
|---|---|---|---|
| 2,700,705 | 1/1955 | Anjesky et al. | 191/59.1 X |
| 3,114,441 | 12/1963 | Sprigings | 191/69 |
| 3,123,191 | 3/1964 | Sprigings | 191/58 |
| 3,124,226 | 3/1964 | Sprigings | 191/59.1 |
| 3,142,368 | 7/1964 | Roney | 191/45 A |
| 3,303,294 | 2/1967 | Howell, Jr. | 191/64 |
| 3,345,471 | 10/1967 | Kilburg | 191/59.1 X |
| 3,396,246 | 8/1968 | Roney | 191/58 |
| 3,405,240 | 10/1968 | Kilburg | 191/59.1 |
| 3,439,132 | 4/1969 | Weber | 191/59.1 X |
| 4,155,434 | 5/1979 | Howell, Jr. | 191/59.1 X |
| 4,194,603 | 3/1980 | Ross, Jr. | 191/58 X |

FOREIGN PATENT DOCUMENTS

| | | | |
|---|---|---|---|
| 55-68801 | 5/1980 | Japan | 191/59.1 |

*Primary Examiner*—Robert B. Reeves
*Assistant Examiner*—David F. Hubbuch
*Attorney, Agent, or Firm*—Charles L. Schwab

[57] ABSTRACT

The electrical collector unit (41) and the overhead conductor entrance (26) are designed so that four collectors (63, 64, 66, 67) can properly enter the conductor slots (18, 19, 21, 22) without manual assistance and with the vehicle, not shown, carrying the collection unit (41) traveling at near a walking speed. Two collector subassemblies (42, 43) are mounted on the vehicle, not shown, each of which carries two collectors and includes spring biased parallel links (73, 74, 76, 77) between a pair of pivot posts (71, 86), a guide roller (61) engageable with side walls (28, 29, 36, 67) of the entrance chute (26) and equalizer beams (134, 136) supporting the collectors (63, 64 or 66, 67).

8 Claims, 5 Drawing Figures

MECHANISM FOR ASSURING REGISTRATION AND CONTACT BETWEEN MULTIPLE TRAVELING COLLECTORS AND PARALLEL CONDUCTORS

BACKGROUND OF THE INVENTION

1. Technical Field

This invention relates to an overhead multiple conductor trolley rail and vehicle mounted collector units having particular utility in storage and retrieval systems.

2. Prior Art

Heretofore, others have provided combinations of overhead conductors and traveling collectors wherein an overhead conductor housing mounts as many as four conductors in the upper portions of downwardly opening slots and wherein collectors are mounted on arms or parallel links which are biased upwardly to insure electrical contact. One such device is shown in U.S. Pat. No. 4,194,603. The beforementioned patent also includes guide means for aligning the collectors with the conductors when a vehicle with the collectors is moved so as to bring the collectors into engagement with the overhead conductors. In U.S. Pat. No. 3,142,368, a funnel-shaped entrance is provided for each of two horizontally-biased collectors so as to guide the latter as they are brought into position for contacting conductors. U.S. Pat. No. 3,142,368, 3,439,132, 3,303,294, 3,405,240, 3,124,226, 3,114,441 and 2,700,705 show collectors mounted on spring biased arms or parallel linkages wherein the collectors are engagable with overhead conductor rails. In these last mentioned patents, the collector support arms and parallel linkages are pivotable relative to their transporting vehicle about a vertical pivot axis and the collectors are pivotally mounted on their support arms or supporting parallel linkages.

BRIEF DESCRIPTION OF THE INVENTION

The present invention is an improved combination of traveling collectors and overhead conductors which provides improved registration and contact between the collectors and conductors. An inclined entrance funnel or chute is mounted on one end of the overhead conductor housing which is engageable by a guide member in the form of a roller so as to properly align the collectors as the material handling vehicle is moved to bring the collectors into engagement with the conductors. During an entrance operation, the collectors engage the top wall of the inclined chute and are thereby cammed downwardly and the guide roller engages converging side walls of the chute to properly align the collectors with the conductor bars. In the illustrated embodiment of the invention, two collectors are mounted on a single biased linkage and are provided with an equalizer bar support so that vertical movement may occur between each pair of collectors.

It is an object of the present invention to provide an improved entrance guide for aligning the collectors with the conductors of an overhead conductor rail at the entrance to the conductor rail housing so that the collectors can properly enter the current carrying conductor rail at a walking speed without manual assistance.

It is a further object of this invention to provide the mechanism hereinbefore outlined wherein the entrance guide includes a downwardly open chute on the conductor rail with side walls diverging outwardly from the entrance of the rail housing and a horizontally disposed guide roller traveling with the collectors and engageable with the side walls during an entrance operation.

It is a further object to this invention to provide an improved mounting for a pair of collectors utilizing an equalizer mechanism permitting relative vertical movement between the two collectors to assure contact between the collectors and the conductors.

BRIEF DESCRIPTION OF THE DRAWINGS

One embodiment of the present invention is illustrated in the drawings in which.

DETAILED DESCRIPTION OF THE DRAWINGS

Figures 1, 2:
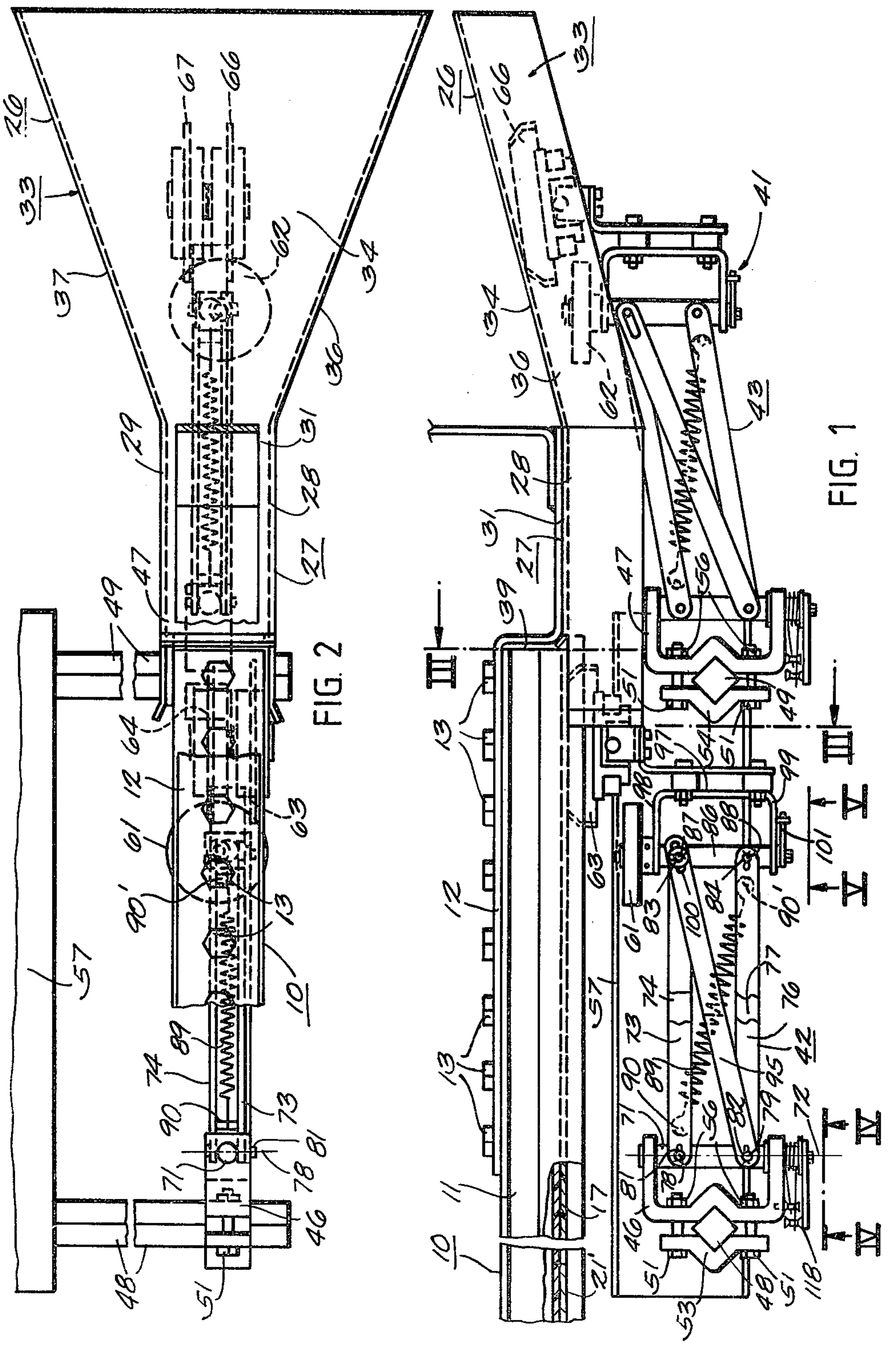
FIG. 1 is a side view showing a combination of an overhead multiple conductor rail and traveling collectors.
FIG. 2 is a top view of the apparatus shown in FIG. 1 with parts broken away for illustration purposes.

Referring to the drawings, a fixed overhead current carrying conductor rail 10 includes an extruded plastic housing 11 which is mounted near the top of a storage facility (not shown) by a suitable bracket 12. The bracket 12 is secured to the plastic housing 11 by a purality of cap screws 13 which are in threaded engagement with threaded openings 14 in a longitudinally extending metal plate 15 inserted into a lipped recess 16 of the housing 11. In the portion of the housing 11 adjacent the entrance, plastic insulating strips 17 are inserted into the upper enlarged width portions of the conductor slots 18, 19, 21, 22 of the housing 11. A short distance from the entrance regular copper conductor bars 21' are utilized in each of the four slots 18, 19, 21, 22.

The entrance to the conductor housing 11 includes a fabricated downwardly open chute or funnel structure 26 made up of a downwardly open channel-shaped portion 27 having a pair of parallel vertical side walls 28, 29 and a top wall 31 and an inclined portion 33 having a top wall 34 and outwardly diverging vertical side walls 36, 37. The vertical side walls 28, 29 of the channel-shaped portion 27 extend below the conductor housing 11 and have portions extending longitudinally beyond the top wall 31 in overlapping relation to the entrance end 39 of the housing 11. The ends of the walls 28, 29 remote from the housing 11 are secured, as by welding, to the laterally spaced vertical walls 36, 37 which diverge from one another in the longitudinal direction away from the entrance end of the conductor housing 11. The vertical walls 36, 37 also incline upwardly in the direction away from the housing 11 and their upper ends are integral with lateral ends of the top wall 34. The top wall 34 inclines upwardly in the direction away from the conductor housing 11 from its integral connection with the upper wall 31 of the channel portion 27. The channel portion 27 of the chute 26 is rigidly secured, as by welding, to the bracket 12.

A collector unit 41 includes a pair of collector subassemblies 42, 43 having clamping brackets 46, 47 rigidly, but releasably, secured to transverse square section bar 48, 49 by bolts 51, extending through aligned openings in clamp parts 53, 54 and brackets 46, 47, and nuts 56. The transverse, parallel bars 48, 49 are secured at corresponding ends to an upper frame member 57 of a material handling vehicle, not otherwise shown. The collection unit subassemblies 42, 43 are identical in construction except for the positioning of the guide rollers 61, 62 which is required because the subassemblies are secured to their support in the form of bars 48, 49 in laterally offset relation to one another so that the collectors 63, 64 on the subassembly 42 will enter first and third laterally positioned conductor slots 18 and 21 and the collectors 66, 67 on the subassembly 43 will enter second and fourth laterally positioned conductor slots 19 and 22. In view of the similarity between the collector unit subassemblies 42, 43, only subassembly 42 will be described in detail.

The vertically spaced longitudinally extending arms of the clamping bracket 46 pivotally support a pivot post 71 on a vertical pivot axis 72 and the post 71 pivotally supports corresponding ends of upper and lower parallel arms or links 73, 74, 76, 77 on vertically spaced parallel transverse axes 78, 79 by pivot pins 81, 82. Pivot pins 83, 84 similarly connect the other corresponding ends of parallel links 73, 74 and 76, 77 to a pivot post 86 on transverse parallel axes 87, 88. A tension spring 89 connected at its opposite ends to pins 90, 90′ on link 74 and link 77, respectively, biases the parallel linkage, 73, 74, 76, 77 to swing upwardly about pins 78, 79. Upward swinging movement of the links is limited by a diagonally positioned restraining link 95 pivotally connected at its lower end to pin 79 and having a slot 100 at its upper end which provides a lost motion connection with the pin 83.

Figure 4:
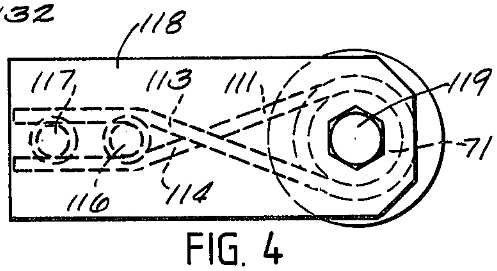
FIG. 4 is a view taken along the line IV—IV in FIG. 1.
Figure 5:
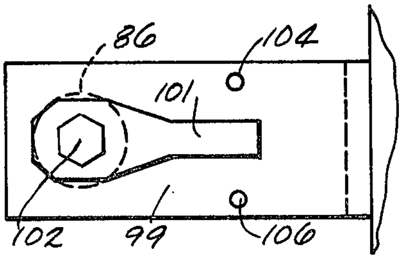
FIG. 5 is a view taken along the line V—V in FIG. 1.

The guide roller 61 is rotatably mounted on an upright cylindrical stub shaft 91 integral with clamp part 92. The clamp part 92 and a clamp part 93 are rigidly clamped to a reduced diameter portion 94 of the post 86 by a pair of cap screws 96 which extend through parallel transvese holes drilled in part 93 and have threaded ends in threaded engagement with drilled and taped holes in part 92. A collector support or mounting structure in the form of a U-shaped bracket 97 has its longitudinally extending upper and lower legs 98, 99 pivotally connected to the post 86. The bracket 97 is free to swing through a predetermined arc relative to the post 86 as limited by engagement of abutment pins 104, 106 press fit in appropriate openings in the lower leg 99 with an arm 101 rigidly secured to the lower end of the post 86 by a cap screw 102. Referring also to FIG. 4, horizontal swinging movement of the parallel links and post 71 relative to the support bracket 46 is resiliently resisted by biasing means in the form of a coil spring device 111 having a coil on the lower end of the post 71 and longitudinally extending ends 113, 114 which engage laterally opposite sides of spools 116, 117 fixed to and extending vertically from the bracket 46 and a plate 118 nonrotatably secured to the lower end of the post 71 by a cap screw 119.

Figure 3:
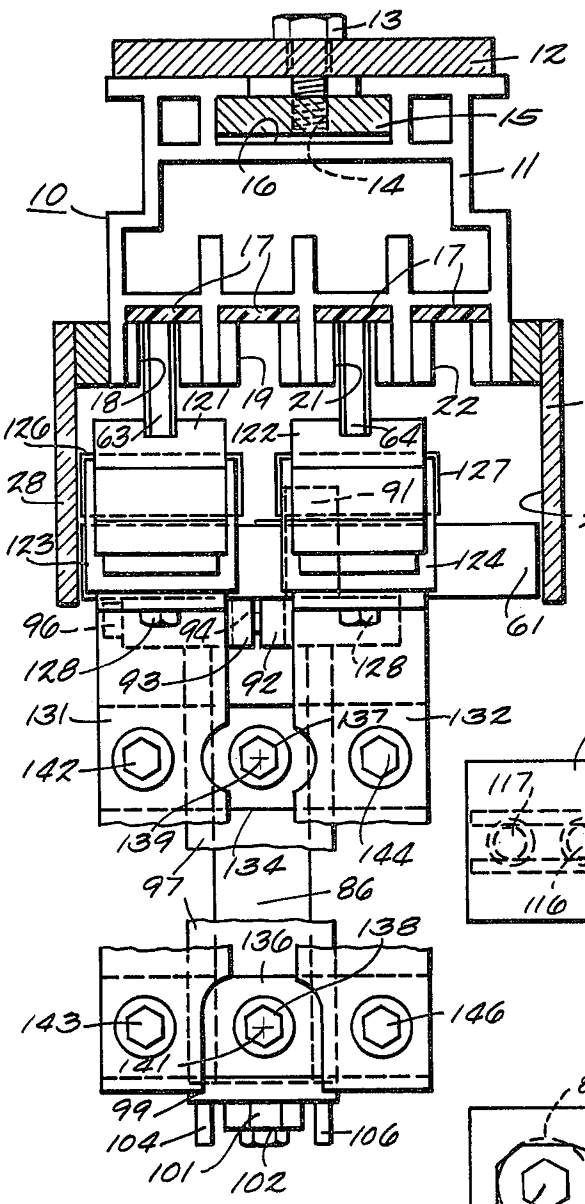
FIG. 3 is a view taken along the line III—III in FIG. 1.

As best shown in FIGS. 1 and 3, the longitudinally elongated collectors 63, 64 are secured to insulator blocks 121, 122 which in turn are pivotally mounted on upstanding legs of pivot blocks 123, 124 by transverse pins 126, 127. The U-shaped pivot blocks are secured by cap screws 128 to horizontal legs of inverted L-shaped support members 131, 132 which in turn are connected to the bracket 97 by an equalizer mechanism permitting relative vertical movement of the support members 131, 132 and the collectors 63, 64 mounted thereon. The equalizer mechanism includes a pair of vertically spaced, parallel equalizer beams 134, 136 which are centrally pivoted to the bracket 97 by pivot bolts 137, 138 for rocking movement about parallel longitudinal axes 139, 141. The laterally outer ends of the equalizer bars 134, 136 are pivotally connected to the collector support members 131, 132 by parallel pivot bolts 142, 143, 144, 146 so that the support members 131, 132 and equalizer bars 134, 136 act as a parallel linkage.

OPERATION

When it is desired to engage the collectors with the current carrying conductor bars, the vehicle carrying the collector unit is moved to a position of general alignment with the overhead conductor rail. As the collector unit approaches the conductor rail entrance, the collectors 63, 64 of the collector subassembly 42 will engage the underside of the inclined top wall 34 and lateral misalignment is corrected by the roller 61 engaging the outwardly diverging side walls 36, 37. The collectors 63, 64 will follow a slide path parallel to the path of the roller 61 as they move through the channel portion 27 of the entrance chute 26. As the collectors enter slots 18 and 21 of the collector housing, the roller 61 will move out of the channel 27 and cease its guiding function, such condition being shown in FIG. 1. After the vehicle has moved a sufficient distance in a path beneath and generally parallel to the conductor rail 10 to bring the collectors 66, 67 into the slots, all four collectors will be in engagement with the plastic filler strips 17 in the slots 18, 19, 21, 22. Further movement of the vehicle will cause the collectors to come into engagement with the copper bars 21′ in the four slots. The use of plastic insulating strips 17 prevents possible electrical shorting which would occur if the collectors 63, 64 contacted the copper conductor bars 21′ before the collectors 66, 67 disengage from the upper wall of the metallic chute 26. When the vehicle is traveling in the opposite direction all collectors will be disengaged from the copper conductor bars 21′ before collectors 66, 67 engage the upper metallic wall 31 of the channel portion 27 of the entrance chute 26. The rollers 61, 62 will keep the collectors in proper position as they travel a reverse path out of the entrance chute 26. The tension spring 89 serves to urge the collectors 63, 64 into proper current conducting contact with the copper conductor bars 21′. The equalizer mechanism in the form of parallel equalizer beams 134, 136 insure that proper upward contacting force is applied to each of the collectors 63, 64 during operation of the vehicle. The use of two parallel equalizer beams causes the equalizing movement of the collectors to be substantially vertical.

The embodiments of the invention in which an exclusive property or privilege is claimed are defined as follows:

1. In combination, a substantially horizontal, longitudinally extending trolley rail housing provided with at least first and second downwardly open slots extending longitudinally of the housing, an electrical conductor mounted in the upper part of each slot presenting a downwardly facing collector-receiving surface, and an electrical pickup unit adapted to be carried by a vehicle traveling in a path directly below and generally parallel to said housing, said unit including supporting means, an arm pivotally mounted at one of its ends to said supporting means for limited pivotal movement about a vertical axis and about a horizontal transverse axis, means biasing said arm to swing upwardly about said horizontal transverse axis, means biasing said arm to a predetermined horizontally centered position, first and second horizontally elongated collectors adapted to extend into said first and second slots, respectively, for electrical contact with said conductors therein, first and second support members pivotally mounting said collectors, respectively, for limited pivotal movement about horizontal transverse rocking axes, a mounting structure pivotally connected to the other end of said arm for limited horizontal swinging movement about a generally vertical axis, and equalizer means connecting said first and second support members to said mounting structure including a horizontally extending equalizer beam having opposite ends pivotally connected to said first and second support members, respectively, on generally longitudinal axes and having a central part pivotally connected to said mounting structure on a generally longitudinal axis.

2. The combination of claim 1 wherein said equalizer means includes a pair of vertically spaced, horizontally extending equalizer beams having corresponding opposite ends pivotally connected to said first and second support members, respectively, on generally longitudinal axes and having their central parts pivotally connected to said mounting structure on generally longitudinal and vertically spaced axes.

3. In combination, a substantially horizontal trolley rail housing provided with a plurality of parallel, downwardly open slots extending lengthwise of the housing, an electrical conductor mounted up in each slot presenting a downwardly facing collector-receiving surface, a downwardly open tapered chute including a pair of substantially vertical side walls having corresponding parallel end portions adjacent an end of said housing and portions diverging outwardly away from said housing, and a top wall between the upper portion of said side walls including upwardly in the direction away from said housing, and an electrical pickup unit adapted to be carried by a vehicle away from said housing and to be returned to it at said end with said chute thereon, said unit including supporting means, a plurality of collectors, mounting means mounting said collectors on said supporting means for vertical and lateral movement relative thereto, spring means urging the collectors upwardly into engagement with said conductors when said unit is beneath said housing, and a guide member movable laterally with said collectors and adapted to engage said vertical side walls when said unit, separated from the housing, is moved toward said chute, and the relative positions of said guide member and collectors being such that when the guide member is between said end portions of said vertical side walls the collectors will be aligned with said conductors and as said unit is moved further in the direction toward said housing, each collector will be cammed downwardly by said top wall and enter a separate predetermined slot to engage the conductor therein.

4. The combination of claim 3 wherein said guide member is a roller rotatably mounted on said mounting means on a substantially vertical axis.

5. In combination, a substantially horizontal trolley rail housing provided with four parallel downwardly open slots extending lengthwise of the housing, an electrical conductor mounted in the upper part of each slot presenting a downwardly facing collector-receiving surface, a funnel-shaped collector entrance guide including a downwardly open channel with a top wall and a pair of substantially parallel vertical guide walls extending parallel to and below the laterally opposite sides of said rail housing, said vertical guide walls having first corresponding ends adjacent an end of said housing and second corresponding ends extending longitudinally beyond said end of said housing, and a tapered chute including a pair of laterally spaced, vertical side walls having first ends adjacent said second ends of said vertical guide walls, said side walls diverging outwardly in the direction away from said housing, and a top wall inclining upwardly from said top wall of said channel with lateral dimension to substantially cover the horizontal space between the upper edges of said diverging side walls, and an electrical pickup unit adapted to be carried by a vehicle away from said housing and to be returned to it at said end with said entrance guide thereon, said unit including supporting means, four collectors engageable, respectively, with said four conductors, mounting means mounting said collectors on said supporting means for vertical and lateral movement relative thereto, spring means urging the collectors upwardly for engaging said conductors when said unit is beneath said housing, and a guide member below the level of said collectors and movable laterally therewith, said guide member being adapted to engage said side walls and guide walls when said unit, separated from the housing, is moved toward said entrance guide, and the relative positions of said guide member and collectors being such that when the guide member is between said guide walls the collectors will be aligned with said conductors and as said unit is moved further in the direction toward said housing, each collector will be cammed downwardly by said top wall and enter a separate slot to engage the conductor therein.

6. The combination of claim 5 wherein said guide member is a roller mounted on said mounting means for rotation about a generally vertical axis.

7. In combination, a substantially horizontal trolley rail housing provided with at least four parallel downwardly open slots extending lengthwise of the housing, an electrical conductor mounted in the upper part of each slot presenting a downwardly facing collector-receiving surface, a downwardly open entrance chute having a pair of laterally spaced vertical side walls with first portions below the laterally opposite sides of said rail housing, said first portions having first corresponding ends adjacent to an end of said housing, said side walls having second portions diverging outwardly away from said first portions, and a top wall between said side walls inclining upwardly in the horizontal direction away from said housing, and an electrical pickup unit adapted to be carried by a vehicle away from said housing and to be returned to it at said end with said entrance guide thereon, said unit including supporting means, four collectors mounted in pairs on said supporting means for vertical and lateral movement relative thereto including equalizer means for each pair of collectors permitting limited relative vertical movement between collectors in each pair, spring means urging the collectors upwardly for engaging said conductors when said unit is beneath said housing, and a guide member below the level of said collectors and movable laterally therewith, said guide member being adapted to engage said side walls when said unit, separate from the housing, is moved toward said entrance guide, and the relative positions of said guide member and collectors being such that when the guide member is between said first portions of said side walls the collectors will be aligned, respectively, with said conductors and as said unit is moved further in the direction toward said housing, each collector will be cammed downwardly by said top wall and enter its predetermined slot to engage the conductor therein.

8. The combination of claim 7 wherein said guide member is a roller mounted on a generally vertical axis.

* * * * *